(12) United States Patent
Owens

(10) Patent No.: US 6,659,497 B1
(45) Date of Patent: Dec. 9, 2003

(54) METHOD AND APPARATUS FOR A TRI-MODAL TRAILER

(76) Inventor: Michael S. Owens, 6175 Wesleyan Dr. North, Macon, GA (US) 31210

( * ) Notice: Subject to any disclaimer, the term of this patent is extended or adjusted under 35 U.S.C. 154(b) by 0 days.

(21) Appl. No.: 10/152,237

(22) Filed: May 21, 2002

(51) Int. Cl.$^7$ ............................................. B62D 63/06
(52) U.S. Cl. ................... 280/656; 280/415.1; 280/789; 296/181
(58) Field of Search ................................. 280/656, 652, 280/639, 42, 40, 63, 415.1, 418, 789, 30; 296/181, 182; 452/187, 189, 192, 128; 224/921, 103; D12/101, 106

(56) References Cited

U.S. PATENT DOCUMENTS

| | | | | |
|---|---|---|---|---|
| 1,221,579 A | * | 4/1917 | Olds | 280/30 |
| 3,025,985 A | * | 3/1962 | Crawford | 414/537 |
| 4,009,762 A | * | 3/1977 | Bjerkgard | 182/20 |
| 4,362,316 A | * | 12/1982 | Wright | 280/656 |
| 4,685,855 A | * | 8/1987 | Celli | 414/482 |
| 4,806,063 A | | 2/1989 | York | |
| 4,860,404 A | | 8/1989 | Flachs | |
| 4,990,049 A | * | 2/1991 | Hargrove | 414/537 |
| 5,330,212 A | | 7/1994 | Gardner | |
| 5,588,907 A | * | 12/1996 | DePietro et al. | 452/187 |
| 5,740,882 A | * | 4/1998 | Griffith et al. | 182/20 |
| 5,788,095 A | * | 8/1998 | Watson | 212/180 |
| 5,820,455 A | * | 10/1998 | Breedlove | 452/187 |
| 5,938,521 A | * | 8/1999 | Jasek et al. | 452/192 |
| 6,045,442 A | * | 4/2000 | Bounds | 452/187 |
| 6,102,468 A | | 8/2000 | Lowrey | |
| 6,164,683 A | | 12/2000 | Kalman | |
| 6,276,698 B1 | * | 8/2001 | Calandra | 280/19 |
| 6,283,496 B1 | * | 9/2001 | Dickman | 280/652 |
| 6,290,023 B1 | * | 9/2001 | Martin | 182/127 |

* cited by examiner

Primary Examiner—Brian L. Johnson
Assistant Examiner—Brian L Swenson
(74) Attorney, Agent, or Firm—Patent Focus, Inc.; Richard C. McComas

(57) ABSTRACT

A mobile tri-modal trailer having a load bearing earth-traversing mode, a felled game processing mode and an equipment transport mode. When the three distinct modes are combined into the tri-modal trailer user may, if desired, transport substantial weight to a hunting location via a any convenient vehicle. Once the user has arrived at the hunting location, the tri-modal trailer is parsed into its three distinct operational functions and supporting apparatus. The felled game processing mode in concert with the equipment transporting mode's supporting apparatus i.e., the felled game processing equipment, is removed from a substantially rectangular member and a retractable A-frame is removed from the confines of its storage chamber. The retractable A-frame is erected into a selected upright position. The felled game processing equipment is attached to the retractable A-frame. After processing the felled game the parsed three modes are recombined into the tri-modal trailer.

8 Claims, 6 Drawing Sheets

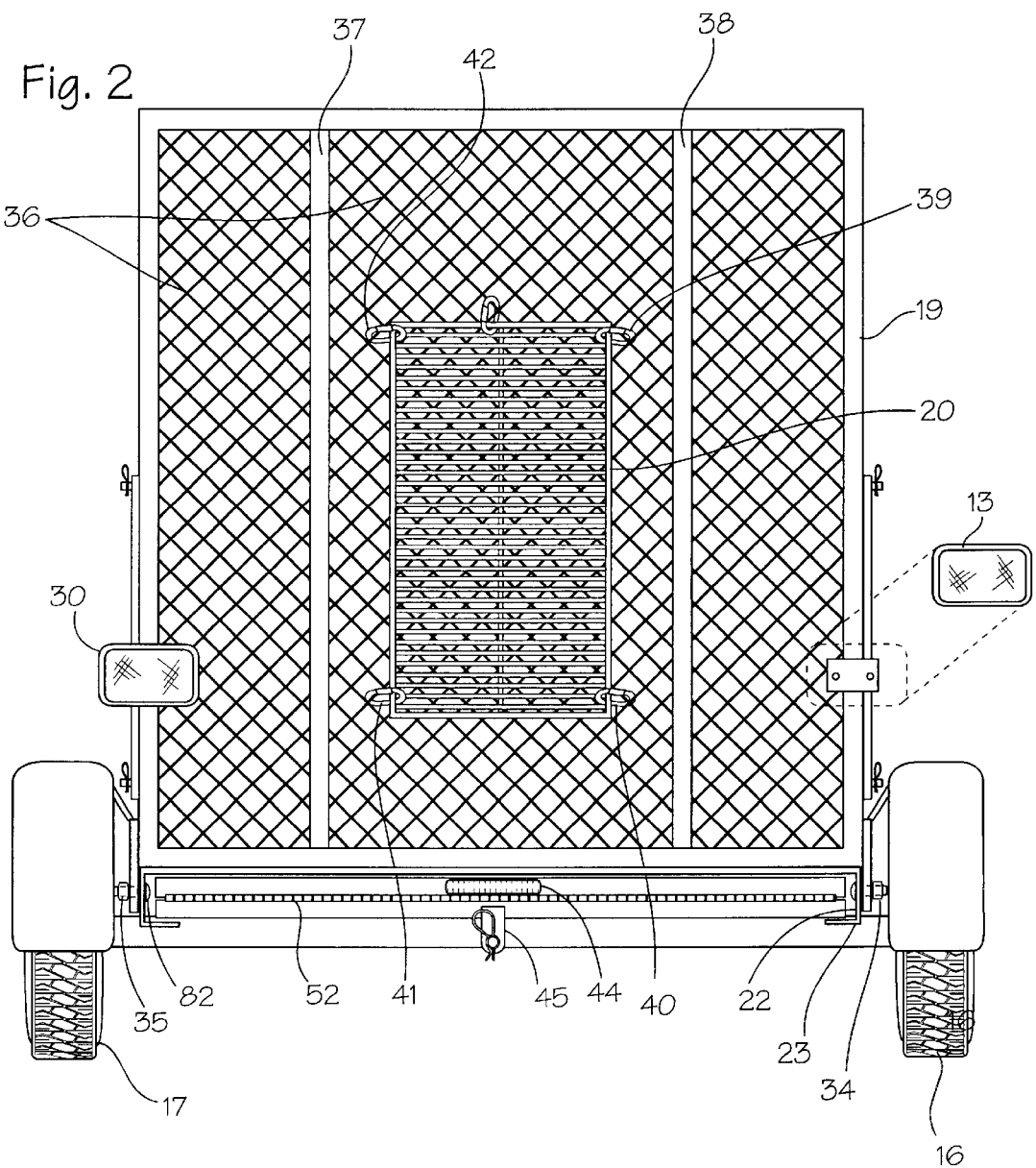

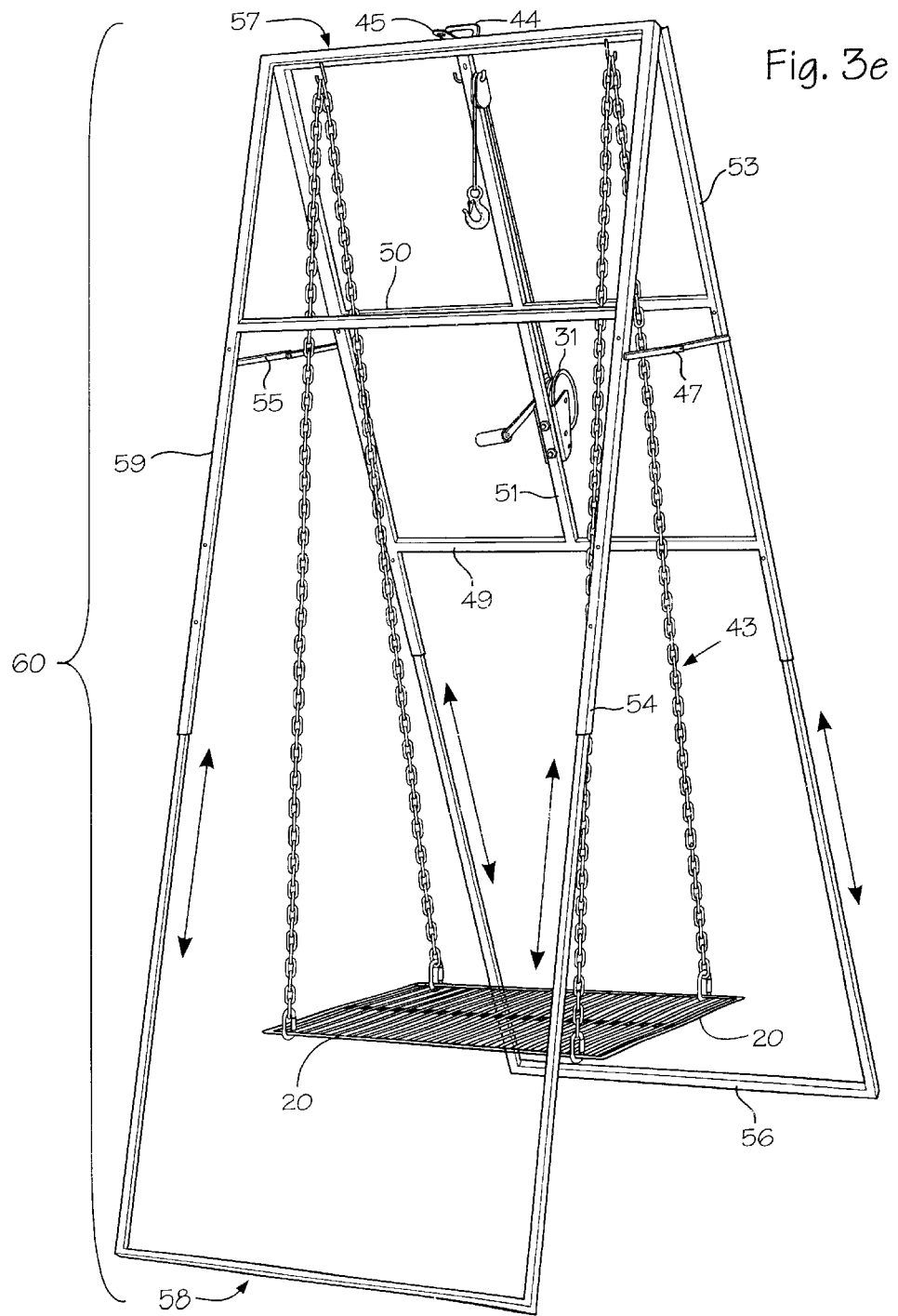

METHOD AND APPARATUS FOR A TRI-MODAL TRAILER

FIELD OF THE INVENTION

The invention relates, in general, to an apparatus to transport transporting hunting and felled game processing equipment. In particular, the invention relates to an apparatus for combining separate hunting and felled game processing equipment into a mobile unitary holding structure. More particularly the invention relates to a mobile unitary holding structure that may be parsed into respective hunting equipment and felled game processing equipment at a hunting location.

BACKGROUND OF THE INVENTION

Historically, game hunters did not have to venture far from home to fell game. As the human population increases game preserves became more restrictive i.e., more people to hunt fewer game. Progressively hunters have to travel farther from home to hunt due to the thinning game population in managed game preserves and overcrowding of hunters. Hunting game often necessitates spending a considerable amount of time in the countryside tracking the intended game and camping-out.

All of the factors surrounding hunting game and camping-out necessitate equipment i.e., a rifle, tent, cooking supplies and game processing equipment. Game processing equipment useful to the game hunter is generally transported by the hunter to the game hunting location. Generally, the game processing equipment includes an apparatus to remove the hide from the felled game and smoking or cooking utensils. Suitable apparatus to remove the hide from felled game having body weights from 80 lbs. to about 1500 lbs. may be quite large and heavy.

Attempts in the past have been focused on repackaging the game hunting equipment to make it more compact and transportable. However, game-processing equipment has remained relatively large, heavy and bulky. Transporting the game processing equipment is still unsuited for cross-country travel. The structural integrity of game processing equipment used at the hunting location is of paramount importance. Game processing equipment used at the hunting location has to function flawlessly because facilities to repair game processing equipment are generally unavailable in the countryside. Due to the cumbersomeness of game processing at the hunting location, felled game is transported to a commercial slaughtering house for processing.

When a hunter fells game during the hunting season, he must carry or drag the animal to a proper slaughtering place or slaughter the animal in the wild where the animal was felled. Transporting the felled animal to a slaughtering house can be a time consuming and strenuous operation.

Attempts have been made to provide the hunter with an apparatus to remove the skin from an animal felled in the wild. One such attempt is placing the carcass of the animal in proximity to a footed pole or member that has an overhead winch. A predetermined portion of the carcass's skin is secured to the footed portion of the apparatus and the hind legs are attached to the winch. The winch is activated and the skin is removed from the animal. While this apparatus may skin selectively sized animals, it does not lend itself to skinning all types and sizes of animals. For example, if an animal's girth is less than the distance between the footed portions of the apparatus, a larger portion of the skin has to be peeled from the meat to reach and be secured to the footed portion. This pre-skinning adds to the risk of contaminating the meat of the animal. Portability of such an apparatus is limited. If the apparatus is disassembled, the subassemblies of the apparatus must be retained or bundled in some manner to be transported in bulk. This attempt does not provide any structure to retain the apparatus after disassembly or means for easily transporting the apparatus once disassembled.

Another attempt to provide the hunter with an apparatus to remove the skin from an animal felled in the wild is a skinning apparatus that secures the antlers of the carcass to a tree and a portion of the skin of the animal is secured to a vehicle via a skin removal tool. The vehicle then moves in a direction opposite from the tree and the skin is removed from the carcass.

It would be desirable to have an apparatus that is easily transported to a hunting location regardless of bulk or weight. The apparatus would be self contained i.e., all felled game processing equipment and hunting equipment would be contained on the transportable apparatus. When the apparatus arrived at the hunting location the apparatus would be parsed into respective felled game processing equipment and hunting equipment to be utilized when needed by the user. Upon completion of hunting or felled game processing the parsed apparatus would be combined into a unitary apparatus ready to be transported to a subsequent location.

SUMMARY OF THE INVENTION

The preferred embodiment of the present invention is a mobile tri-modal trailer having a load bearing earth-traversing mode, a felled game processing mode and an equipment transport mode. The three aforementioned modes have distinct operational and supporting apparatus. When the three distinct modes are combined into the tri-modal trailer a user may, if desired, transport the present invention to a desired hunting location. Once the user has arrived at the hunting location, the tri-modal trailer may, if desired, be parsed into three distinct operational functions and supporting apparatus enabling the user to process felled game at the hunting location.

In operation the user of the present invention may, if desired, avail himself to one, all or any combination of the respective modes of the present invention. A typical operation of the present invention is to have all three of its distinct operational functions and supporting apparatus combined into the tri-modal trailer. The present invention's load bearing earth-traversing mode enabling the transport of substantial weight is towed to a game hunting location via any convenient vehicle. At the hunting location the present invention may, if desired, be unhitched from the vehicle.

The present invention is parsed into its respective modes: The felled game processing mode in concert with the equipment transporting mode's supporting apparatus i.e., the felled game processing equipment is removed from a substantially rectangular member and a retractable A-frame is removed from the confines of its storage compartment or chamber. The load bearing earth-traversing mode has self contained apparatus to facilitate the storage, transport and retrieval of the A-frame. The retractable A-frame is erected into a selected upright position. The felled game processing equipment is attached to the retractable A-frame. The A-frame is extended into a subsequent upright position suitable to suspend felled game thereon. Once the felled game is processed the renderings may, if desired, be transported via the load bearing earth-traversing mode. The parsed three modes of the present invention are recombined into the tri-modal trailer and if desired transported to a subsequent location.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which:

FIG. 2 illustrates an end view schematic diagram of the equipment transport mode of the present invention, FIG. 3e illustrates a perspective view schematic diagram of the assembly of the felled game processing mode and the equipment mode of the present invention,

DETAILED DESCRIPTION OF THE PREFERRED EMBODIMENT OF THE PRESENT INVENTION

Figure 1:
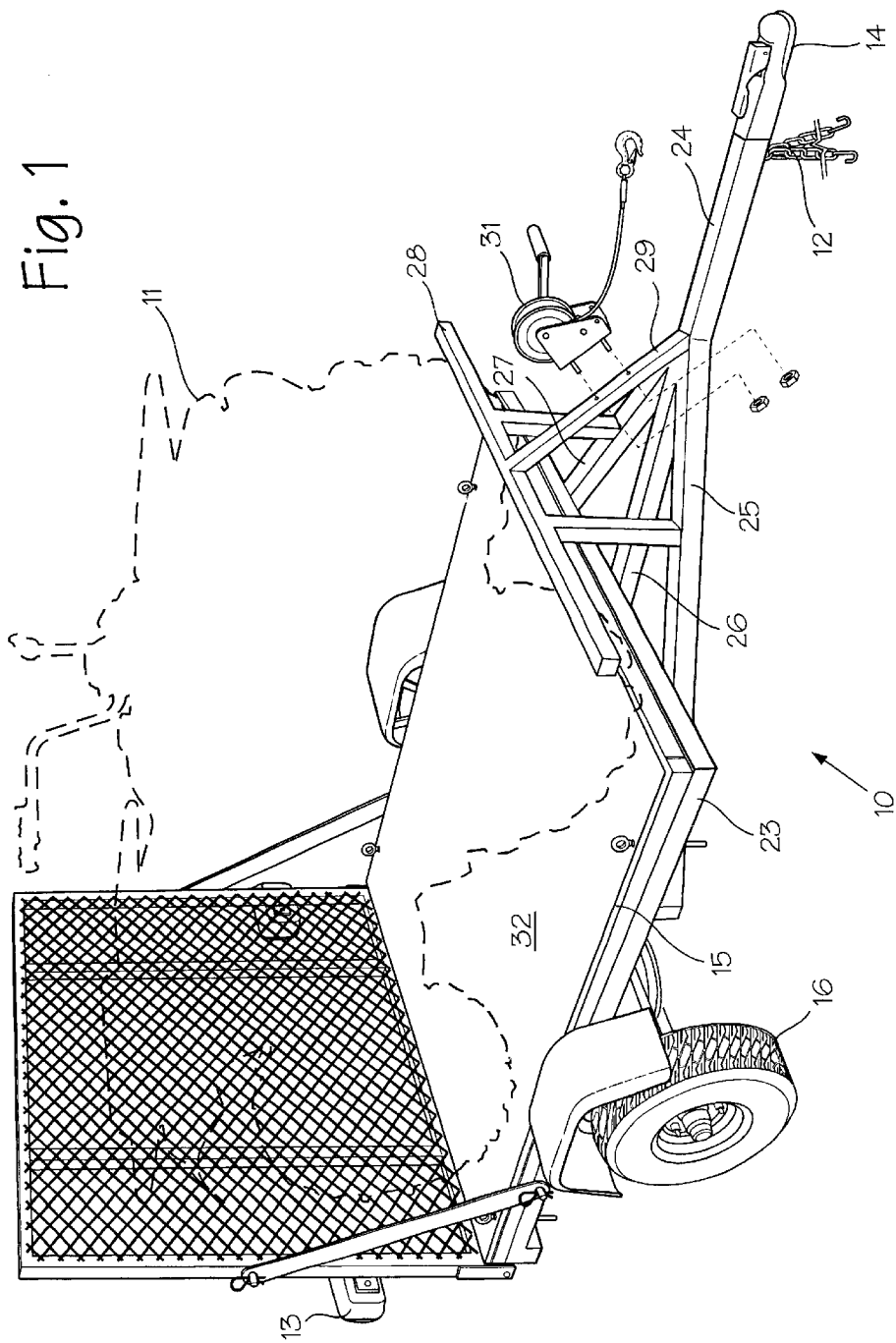
FIG. 1 illustrates a top level perspective view schematic diagram of the load bearing earth traversing mode of the present invention.

Before describing in detail the particular improved tri-modal trailer in accordance with the present invention, it should be observed that the invention resides primarily in a novel structural combination of conventional tri-modal trailer apparatus, discrete subsystems or subassembly components, associated control of the aforementioned tri-modal trailer, and not in the particular detailed configuration thereof. Accordingly, the structure, command, control, and arrangement of these conventional components and subassemblies have, for the most part, been illustrated in the drawings by readily understandable diagram representations and schematic diagrams. The drawings show only those specific details that are pertinent to the present invention in order not to obscure the disclosure with structural details which will be readily apparent to those skilled in the art having the benefit of the description herein. For example, safety chains 12, trailer hitch 14 and tail light assembly 13, FIG. 1 have numerous connections to the present invention 10. Various portions of the safety chains 12, trailer hitch 14 and tail light assembly 13 connections to the present invention 10 have been simplified in order to emphasize those portions that are most pertinent to the invention. Thus, the top level diagram and the schematic diagram illustrations of the Figures do not necessarily represent the mechanical structural arrangement of the exemplary system, and are primarily intended to illustrate major hardware structural components of the system in a convenient functional grouping whereby the present invention may be more readily understood.

An overview of the present invention generally illustrated at 10, FIG. 1: The preferred embodiment of the present invention 10 is a mobile tri-modal trailer having a load bearing earth-traversing mode, a felled game processing mode and an equipment transport mode. The three aforementioned modes have distinct operation and supporting apparatus. When the three distinct modes are combined into the tri-modal trailer a user may, if desired, transport the present invention 10 to a desired hunting location. Once the user has arrived at the hunting location, the tri-modal trailer may, if desired, be parsed into three distinct operational functions and supporting apparatus.

In operation the user of the present invention 10, FIG. 1 may, if desired, avail himself to one, all or any combination of the respective modes of the present invention 10. A typical operation of the present invention 10 is to have all three of its distinct operational functions and supporting apparatus combined into the tri-modal trailer. The present invention's 10 load bearing earth-traversing mode enabling the transport of substantial weight is towed to a game hunting location via a trailer hitch 14. At the hunting location the present invention 10 may, if desired, be unhitched from the vehicle.

Figure 3A:
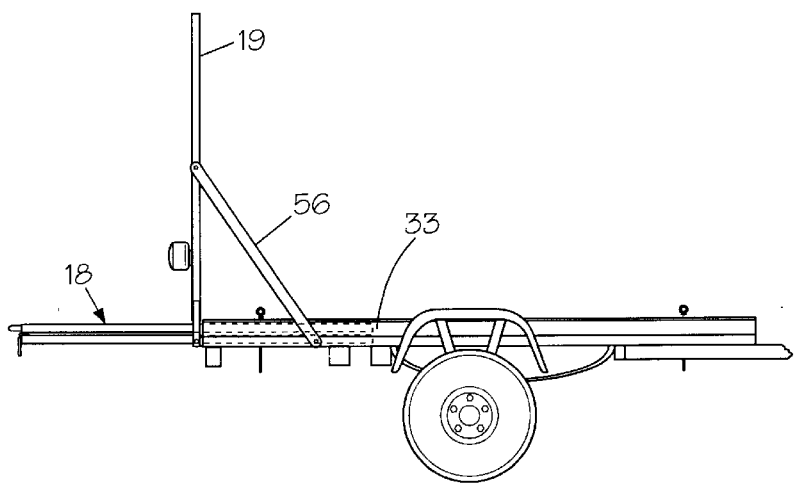
FIG. 3a illustrates a side view schematic diagram of FIG. 1.

The present invention 10, FIG. 1 parsed into its respective modes: The felled game processing mode in concert with the equipment transporting mode's supporting apparatus i.e., the felled game processing equipment is removed from a substantially rectangular member 19 and an A-frame 18 is removed from the confines of its storage compartment. The A-frame 18 is erected into a selected upright position. The felled game processing equipment is attached to the A-frame 18. The A-frame 18 is extended into a subsequent upright position suitable to suspend felled game 63, FIG. 3d thereon. The user of the present invention 10 may, if desired, avail himself to the processing of the felled game. Once the felled game is processed the renderings may, if desired, be transported via the load bearing earth-traversing mode. The parsed three modes of the present invention 10 are recombined into the tri-modal trailer and if desired transported to a subsequent location.

A more detailed discussion of the present invention 10, FIG. 1: The load bearing earth-traversing mode comprising a mobile substantially rectangular frame 23 with one short side open. The rectangular frame 23 has interior C-shaped sidewalls 22, FIG. 2 forming a channel 33, FIG. 3a. A substantially rectangular load-bearing platform 15 is mounted onto the rectangular frame 23. The rectangular load-bearing platform 15 may, if desired, be secured to the rectangular frame 23 by any convenient means known in the art. The combination of the rectangular frame 23, channel 33 and the load-bearing platform 15 forms a substantially rectangular chamber 82, FIG. 2. The rectangular frame's 23 open end provides access to the interior of the chamber 82.

The rectangular frame 23 has at least one ground engaging wheel 16. A second wheel 17 may, if desired, be added to the rectangular frame 23 via an axle connecting wheel 16 and wheel 17. The axle is leaf spring attached to the rectangular frame 23. An elongated rectangularly shaped towing tongue 24 has one end perpendicularly mounted to the rectangular frame's 23 other short side via a plurality of elongated rectangular support members 25, 26 and 27. A substantially rectangular upright pi-shaped stop member 28 is adjacently spaced from the rectangular frame 23. The rectangular upright pi-shaped stop member 28 has one end connected to the rectangular support members 25, 26, and 27. An elongated rectangularly shaped support member 29 has one end connected to the top portion of the rectangular upright pi-shaped stop member 28 and the other end connected to the substantially rectangular towing tongue 24. A winch 31 may, if desired, be detachably secured to the rectangularly shaped support member 29 via a plurality of nuts and bolts.

The rectangular load-bearing platform 15, FIG. 1 has a top surface 32. The top surface 32 may, if desired, be perforated or solid of sufficient structural integrity to support substantial weight. An example of substantial weight is the weight of an all terrain vehicle (ATV) 11 illustrated in phantom on FIG. 1. The load-bearing platform 15 is connected to the rectangular frame 23 via a plurality of nuts and bolts if the load-bearing platform 15 is fabricated from non-metallic material. If the load-bearing platform 15 is fabricated from metallic material suitable securing means are implemented. An example of suitable securing means is welding a metallic rectangular frame 23 to a metallic load-bearing platform 15.

The equipment transporting mode comprising a substantially rectangular member 19 is pivotally connected to the rectangular frame 23 via pins 34 and 35. Pins 34 and 35 traverse the sidewalls of the open end of the rectangular frame 23. A pair of elongated rectangular cross-members 37 and 38 are connected to the rectangular member 19. The rectangular member 19 may, if desired, have a perforated surface 36. The rectangular cross-members 37 and 38 support the perforated surface 36 along with the structural perimeter of the rectangular member 19. A pair of taillights 13 and 30 may, if desired, be detachably mounted to the substantially rectangular member 19. The electrical hookups for the taillights 13 and 30 are routed to the distal portion of the present invention 10 for user defined connection to the vehicle towing the present invention 10. The taillights 13 and 30 may, if desired, be detached from the substantially rectangular member 19. If desired the substantially rectangular member 19 may be pivoted from an upright position to a ramp position thereby allowing access to the interior of the rectangular load-bearing platform 15. The substantially rectangular member 19 is secured in the upright position via a pair of elongated rectangular straps 56, FIG. 3a.

A plurality of equipment may, if desired, be mounted onto the perforated surface 36 of the substantially rectangular member 19 for transport to the hunting location. The equipment may, if desired, be connected to the perforated surface 36 via at least one quick release hasp 39. For example, a substantial rectangular grilling grate 20 is detachably secured to the perforated surface 36 via a plurality of quick release hasps 39, 40, 41, and 42. A suspension chain 43, FIG. 3e may, if desired, be wrapped around the rectangular grilling grate 20 for storage and transport to the hunting location.

The felled game processing mode comprising an A-frame 18, FIG. 2 is retractable into the same shape as the chamber 82. The A-frame 18 is retracted into a substantially rectangular shape and is slidably inserted along channel 33 into the interior of the chamber 82 for storage and transport. A handle 44 is connected onto one end of the A-frame 18 to conveniently aid in the insertion and removal of the A-frame 18 from the chamber 82. The A-frame 18 is detachably secured within the confines of the chamber 82 via a hasp and pin combination 45. The hasp and pin combination 45 may, if desired, be connected to the top portion of the A-frame 18 and to the rectangular frame 23 thereby securing the A-frame 18 to the rectangular frame 23.

Figure 3B:
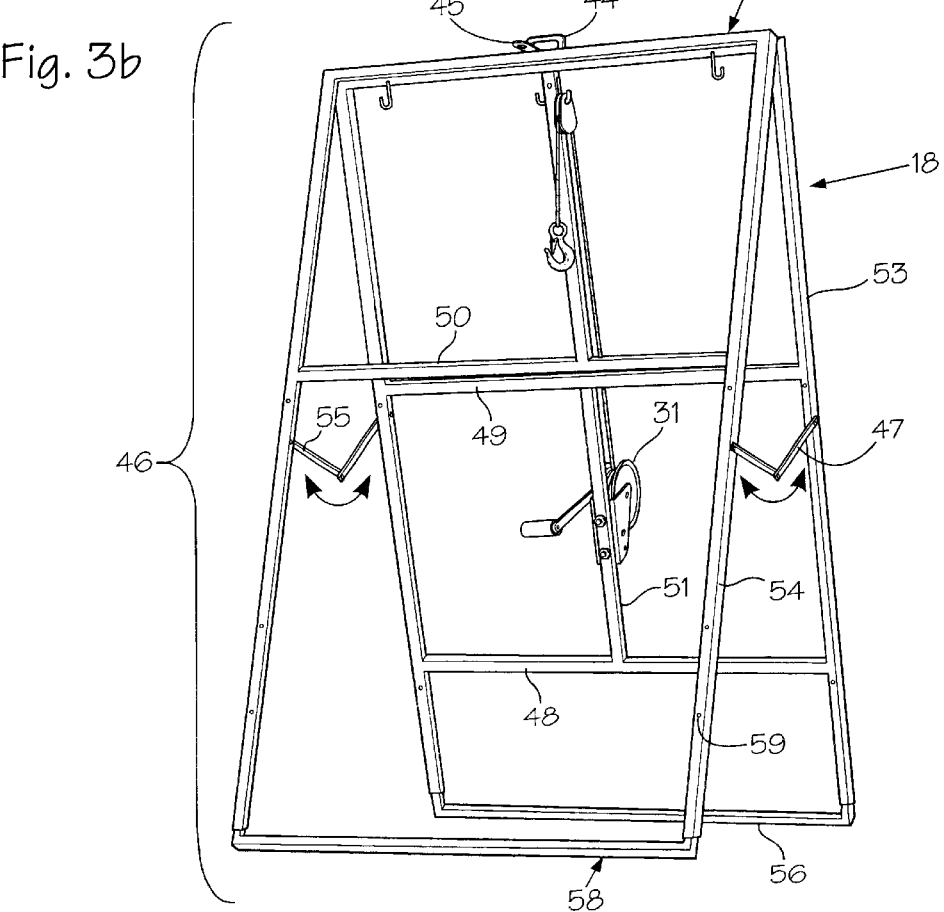
FIG. 3b illustrates a perspective view schematic diagram of the felled game processing mode of the present invention in a first upright position.

The A-frame 18, FIG. 3b is slidably removed from the chamber 82 via handle 44. The A-frame 18 is erected into a first upright position 46. The transported felled game processing equipment is removed from storage. For example, the rectangular grilling grate 20 is removed from the perforated surface 36 and the suspension chain 43 is retrieved from storage. The suspension chain 43 has one end connected to the rectangular grilling grate 20 and the end connected to the A-frame 18. The winch 31 is removed from the rectangularly shaped support member 29 and connected to the A-frame 18. The block and tackle portion of the winch 31 is operatively positioned on the A-frame via any convenient means known to a person skilled in the art.

The A-frame 18, FIG. 3b comprises a pair of substantially rectangular legs 53 and 54, FIG. 3b. The rectangular legs 53 and 54 have structural support cross-members 48, 49, 50, 51 and 62 mounted thereto. The cross-members 48, 49, 50, 51 and 62 have sufficient structural integrity to support the weight of the felled game. When the A-frame 18 is retracted into the shape of the chamber 82 and stored within the chamber 82 the cross-members 48, 49, 50, 51 and 62 support the weight of loads placed on the top surface 32 of the rectangular load-bearing platform 15.

The rectangular legs 53 and 54 are pivotally connected at one end via a hinge 52, FIG. 2. The hinge 52 extends along one end or the distal end 57 of the rectangular legs 53 and 54 thereby forming a pivotal union. The width of separation of the hinged reticular legs 53 and 54 may, if desired, be any width as determined by the folding arms 47 and 55 mounted to the respective reticular legs 53 and 54. The other end or proximal end 58 of the rectangular legs 53 and 54 is sidably insertable into the distal end 57. The proximal end 58 and the distal end 57 are selectively hinged together via a plurality of push button hinge connectors 59 distributed along the long sides of the rectangular legs 53 and 54. In operation the push button hinge connectors 59 are depressed and the proximal end 58 and distal end 57 may, if desired, be sidably extended forming or erecting a second upright position 60, FIG. 3e for the A-frame 18.

Figure 3C:
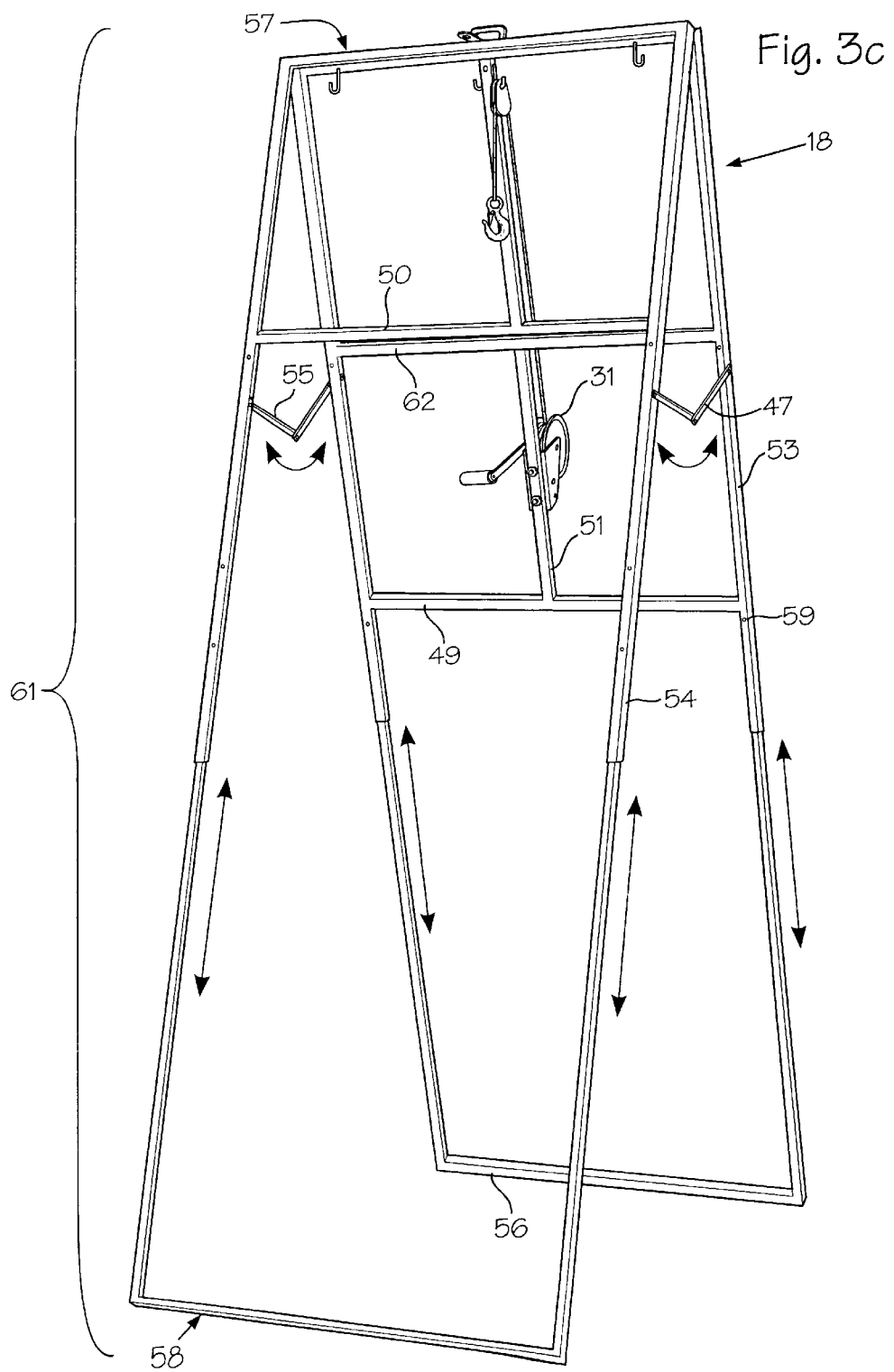
FIG. 3c illustrates a perspective view schematic diagram of the second upright position of FIG. 3b.
Figure 3D:
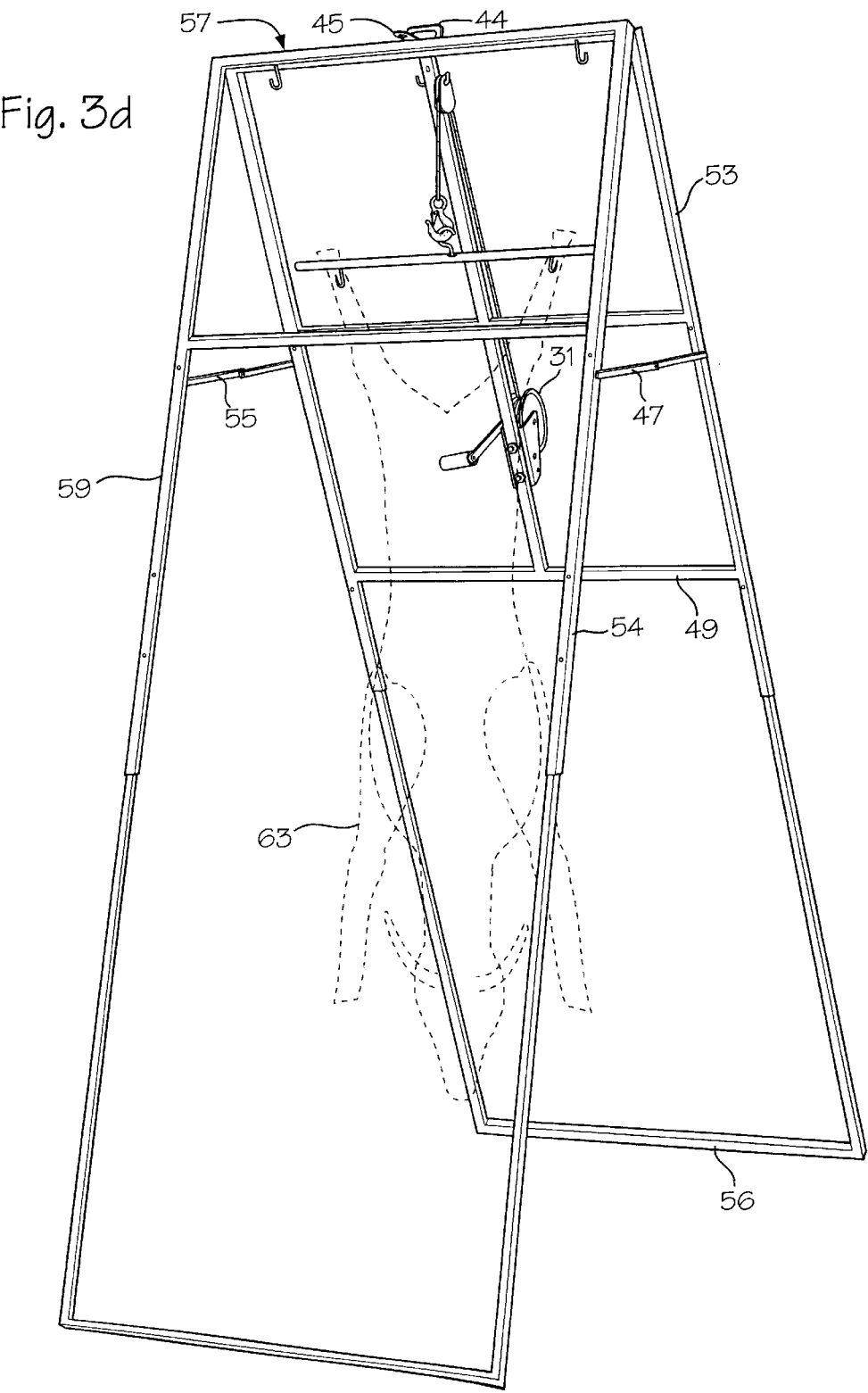
FIG. 3d illustrates a perspective view schematic diagram of the operational aspects of the felled game processing mode of FIG. 3c.

The proximal end 58 and distal end 57 may, if desired, be further extended by depressing the push button hinge connectors 59 and slidably extending the proximal end 58 outwardly from the distal end 57 forming or erecting a third upright position 61, FIG. 3c for the A-frame 18. The felled game processing equipment may, if desired, be installed on the present invention 10 at any selected upright position of A-frame 18. The winch 31 may, if desired, be implemented to hoist and process the felled game 63, illustrated in phantom.

The best mode of operation of the present invention 10, FIGS. 1 to 3e: The load bearing earth-traversing mode, felled game processing mode and the equipment transporting mode are combined into a tri-modal trailer and transported to a selected hunting location. The felled game processing equipment is removed from the substantially rectangular member 19. The A-frame 18 sidably removed from the chamber 82 and erected into a selected upright position wherein selected felled game processing equipment is installed. The A-frame 18 may, if desired, be erected into subsequent upright positions at the user's discretion. The tri-modal trailer is now parsed and ready to process the felled game 63.

Upon completion of the felled game processing the load bearing earth-traversing mode, felled game processing mode and the equipment transporting mode are combined to reform the tri-modal trailer. The user may, if desired, transport the present invention 10 to a subsequent location.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

I claim:

1. A tri-modal trailer comprising
   a) a load bearing earth-traversing mode, comprising a mobile substantially rectangular frame having one short side open;
   b) said rectangular frame having interior sidewalls forming a channel therein;
   c) a substantially rectangular load bearing platform mountably disposed to said rectangular frame;
   d) a felled game processing mode, comprising a retractable A-frame, said retractable A-frame slidably insertable into said rectangular frame via said channel;
   e) an equipment transporting mode, comprising a first substantially rectangular member pivotally disposed to said rectangular frame;
   f) said retractable A-frame comprising a first hollow substantially rectangular member having a first proximal end and a first distal end;
   g) said first proximal end being sidably insertable into said first distal end;
   h) a second hollow substantially rectangular member having a second proximal end and a second distal end;
   i) said second proximal end being sidably insertable into said second distal end;
   j) said first and said second hollow substantially rectangular members having their respective distal ends hinged together;
   k) means, disposed on said first and said second hollow substantially rectangular members for structural support;
   l) a winch with cable mountably disposed to said means for structural support;
   m) at least one mounted guide hook adjacently spaced from the juncture of said hinged first and said second hollow substantially rectangular members; and
   n) said guide hook receiving said winch's cable.

2. A tri-modal trailer as recited in claim 1 wherein said mobile rectangular frame having at least one ground-engaging wheel mountably disposed along each long side of said substantially rectangular frame.

3. A tri-modal trailer as recited in claim 1 wherein said first rectangular member further comprising a perforated top surface, said perforated top surface having means for attaching felled game processing equipment thereto.

4. A tri-modal trailer as recited in claim 1 further comprising a pair of oppositely spaced substantially rectangular retaining members, said retaining members each having one end detachably disposed to said first rectangular member and the other end detachably disposed to said rectangular frame.

5. A tri-modal trailer as recited in claim 1 further comprising:
   a) a towing assembly perpendicularly positioned and mountably disposed to said rectangular frame's other short side oppositely spaced from said rectangular frame's open end;
   b) means for vehicle connecting mountably disposed to said towing assembly;
   c) an elongated stop-bar assembly positionally disposed above said towing assembly between said means for vehicle connecting and said rectangular frame;
   d) said stop-bar assembly mountably disposed to said towing assembly; and
   e) a winch assembly detachably disposed to said stop-bar assembly.

6. A tri-modal trailer as recited in claim 5 wherein said elongated stop-bar assembly comprises:
   a) a second elongated rectangular member having a plurality of outwardly extending support members, said support members each having one end mountably disposed to said towing assembly.

7. A tri-modal trailer as recited in claim 6 wherein said towing assembly comprises:
   a) a third elongated rectangular member perpendicularly positioned to said rectangular frame, said third rectangular member having one end mounted to said rectangular frame, said third rectangular member's other end having means for vehicle connecting disposed thereto; and
   b) a pair of substantially rectangular support members mountably disposed to said third rectangular member and said rectangular frame.

8. A tri-modal trailer comprises:
   a) a load bearing earth-traversing mode comprises a substantially rectangular frame having one short side open, said rectangular frame having interior sidewalls, said interior sidewalls forming a channel disposed the length of said interior sidewalls;
   b) said rectangular frame having at least one ground engaging wheel mountably disposed on each long side of said rectangular frame;
   c) a substantially rectangular load bearing platform mountably disposed to said rectangular frame;
   d) a felled game processing mode comprises an A-frame extendable and retractable into the shape of said rectangular frame via means disposed on said A-frame for selectively extending and retracting;
   e) said A-frame sidably insertable into said rectangular frame via said channel;
   f) an equipment transporting mode comprises a substantially rectangular member having a perforated top surface, said rectangular member having one short side adjacently spaced from said rectangular frame's open end in an upright first position, each long side of said rectangular member adjacent to said rectangular frame's open end being pivotally connected to each said rectangular frame's long sides;
   g) a plurality of C-shaped retaining hasps detachably disposed to said perforated surface for retaining equipment thereto;
   h) a pair of elongated retaining members each having one end detachably secured to said rectangular member's long sides;
   i) said pair of elongated retaining members' other ends detachably secured to each said rectangular frame's long sides, detachably securing said rectangular member in said first position;

j) a second position formed via said rectangular member's other short side, oppositely spaced from said rectangular frame's open end, arcuately pivoting until said short side is ground engaging;

k) said second position forming ramp access to said rectangular load bearing platform via said perforated top surface;

whereby the tri-modal trailer enabling the transport of substantial weight via said load bearing earth-traversing mode, the processing of game at the game hunting location via said felled game processing mode utilizing equipment provided via said equipment transporting mode.

* * * * *